United States Patent
Matsui (10) Patent No.: US 8,314,880 B2
(45) Date of Patent: Nov. 20, 2012

(54) PHOTOGRAPHIC ILLUMINATION DEVICE, IMAGE-CAPTURING SYSTEM, CAMERA SYSTEM AND CAMERA

(75) Inventor: Hideki Matsui, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/929,367

(22) Filed: Jan. 19, 2011

(65) Prior Publication Data

US 2011/0115970 A1    May 19, 2011

Related U.S. Application Data

(63) Continuation of application No. 12/318,463, filed on Dec. 30, 2008, now abandoned, and a continuation of application No. 11/000,429, filed on Dec. 1, 2004, now abandoned.

(30) Foreign Application Priority Data

Dec. 5, 2003   (JP) .................................. 2003-407500

(51) Int. Cl.
*H04N 5/222*   (2006.01)
*G03B 15/02*   (2006.01)
*G03B 3/00*    (2006.01)
*G03B 15/03*   (2006.01)
*G03B 15/06*   (2006.01)

(52) U.S. Cl. ............ 348/370; 348/371; 396/61; 396/89; 396/174; 396/176

(58) Field of Classification Search .................. 348/370; 399/336, 67, 320, 335, 337; 396/61, 89, 396/174, 176
See application file for complete search history.

(56) References Cited

U.S. PATENT DOCUMENTS

| | | | |
|---|---|---|---|
| 4,477,171 | A | 10/1984 | Yamada |
| 4,542,975 | A | 9/1985 | Ishida et al. |
| 4,899,191 | A | 2/1990 | Maruyama |
| 5,005,042 | A | 4/1991 | Sato et al. |
| 5,132,718 | A | 7/1992 | Fujino et al. |
| 5,266,990 | A | 11/1993 | Sakamoto et al. |
| 5,602,614 | A | 2/1997 | Ohtsuka et al. |
| 5,682,562 | A | 10/1997 | Mizukoshi et al. |
| 6,009,281 | A | 12/1999 | Hosomizu et al. |

(Continued)

FOREIGN PATENT DOCUMENTS

DE       3228042  A1   2/1983

(Continued)

OTHER PUBLICATIONS

Aug. 30, 2011 Office Action issued in Japanese Patent Application No. 2003-407500 (with translation).

(Continued)

*Primary Examiner* — Chieh M Fan
*Assistant Examiner* — Quang Le
(74) *Attorney, Agent, or Firm* — Oliff & Berridge, PLC (57) ABSTRACT

An image-capturing system includes: an image-capturing device that captures an image of a subject; and an illumination device that illuminates the subject. The image-capturing device includes a control unit that calculates a light quantity needed to illuminate the subject based upon at least, either an exposure time or an aperture value and image-capturing sensitivity. The illumination device includes a current-controlled light emission unit that emits light used to illuminate the subject and a light emission control unit that controls the light emission unit so as to emit light in the light quantity calculated by the control unit.

22 Claims, 5 Drawing Sheets

U.S. PATENT DOCUMENTS

| | | | |
|---|---|---|---|
| 6,160,960 | A | 12/2000 | Mikoshiba et al. |
| 6,331,062 | B1 | 12/2001 | Sinclair |
| 6,407,512 | B1 | 6/2002 | Yoshida et al. |
| 6,427,061 | B1 | 7/2002 | Miura et al. |
| 6,556,790 | B2 | 4/2003 | Matsui et al. |
| 6,985,169 | B1 | 1/2006 | Deng et al. |
| 2002/0025157 | A1 | 2/2002 | Kawakami |
| 2002/0171372 | A1 | 11/2002 | Motomura et al. |
| 2007/0189754 | A1 | 8/2007 | Iwasaki |

FOREIGN PATENT DOCUMENTS

| | | |
|---|---|---|
| DE | 3810258 A1 | 10/1988 |
| JP | A-57-48719 | 3/1982 |
| JP | A-57-105726 | 7/1982 |
| JP | A-59-211025 | 11/1984 |
| JP | U-06-040939 | 5/1994 |
| JP | A-09-061904 | 3/1997 |
| JP | A-9-61908 | 3/1997 |
| JP | A-9-179173 | 7/1997 |
| JP | A-10-170993 | 6/1998 |
| JP | A-11-27655 | 1/1999 |
| JP | A-11-177970 | 7/1999 |
| JP | A-2001-166352 | 6/2001 |
| JP | A-2002-116481 | 4/2002 |
| JP | A-2002-148686 | 5/2002 |
| JP | A-2002-207236 | 7/2002 |
| JP | A-2003-84341 | 3/2003 |
| JP | A-2003-114462 | 4/2003 |
| JP | A-2003-114463 | 4/2003 |
| JP | A-2003-233109 | 8/2003 |
| JP | A-2003-241266 | 8/2003 |
| JP | A-2003-307771 | 10/2003 |

OTHER PUBLICATIONS

Jan. 14, 2010 Office Action for Japanese Patent Application No. 2003-407500 (with translation).

Japanese Patent Office, *Japanese Office Action for* Japanese Patent Application No. 2003-407500 (with English translation), mailed Aug. 31, 2010, pp. 1-2 (pp. 1-3 for translation).

European Search Report dated Dec. 29, 2010 for European Application No. EP 04106218.3.

Jan. 19, 2010 Office Action for Japanese Patent Application No. 2003-407500 (with translation).

Feb. 14, 2012 Office Action issued in Japanese Patent Application No. 2003-407500 (with translation).

PHOTOGRAPHIC ILLUMINATION DEVICE, IMAGE-CAPTURING SYSTEM, CAMERA SYSTEM AND CAMERA

This is a Continuation of application Ser. No. 12/318,463 filed Dec. 30, 2008, application Ser. No. 11/000,429 filed Dec. 1, 2004, which claims the benefit of Japanese Patent Application No. 2003-407500 filed Dec. 5, 2003. The disclosures of the prior applications are hereby incorporated by reference herein in their entirety.

BACKGROUND OF THE INVENTION

1. Field of the Invention

The present invention relates to an illumination device used to illuminate a main subject during a photographing operation, an image-capturing system, a camera system and a camera.

2. Description of the Related Art

There is a camera known in the related art that illuminates a main subject with an illumination device that uses an LED-type instead of a discharge-type illumination device such a xenon discharge tube (see Japanese Laid Open Patent Publication No. 2002-207236). In the camera disclosed in Japanese Laid Open Patent Publication No. 2002-207236, the quantity of light to be emitted from the illumination device is determined based upon the subject distance measured by a range finding device and the film sensitivity. The publication discloses that the light quantity is controlled by varying the number of LEDs driven, the value of the electrical current which drives the LEDs and the length of time over which the LEDs emit light.

SUMMARY OF THE INVENTION

There is a concern that overexposure or underexposure may occur during a daylight synchronous (fill-in flash) photographing operation or a slow synchronous photographing operation unless the photographing operation is performed by taking into consideration the shutter speed and the aperture value.

According to the 1st aspect of the invention, a photographic illumination device comprises: a current-controlled light emission means that emits illuminating light toward a subject; a range finding means that detects distance information indicating a distance to a main subject; and a light emission control means that controls the light emission means to emit light in a quantity calculated by using the distance information detected by the range finding means and an exposure time, an aperture value and a photographic sensitivity set in a camera.

According to the 2nd aspect of the invention, a photographic illumination device comprises: a current-controlled light emission means that emits illuminating light toward a subject; and a light emission control means that controls the light emission means to emit light in a quantity calculated by using distance information indicating a distance to a main subject which is detected by a range finding means in a camera and an aperture time, an aperture value and a photographic sensitivity set in the camera.

According to the 3rd aspect of the invention, in the photographic illumination device according to the 1st aspect or the 2nd aspect, it is preferred that the light emission control means continuously supplies a drive current to the light emission means over a specific length of time.

According to the 4th aspect of the invention, in the photographic illumination device according to the 3rd aspect, it is preferred that the light emission control means gradually increases the drive current.

According to the 5th aspect of the invention, in the photographic illumination device according to the 1st aspect or the 2nd aspect, it is preferred that the light emission control means supplies a pulse drive current to the light emission means a specific number of times.

According to the 6th aspect of the invention, in the photographic illumination device according to any of the 3rd through 5th aspects it is preferred that the light emission control means stops supplying the drive current once an integrated value representing light having been reflected off the subject illuminated by the light emission means becomes equal to a value corresponding to the calculated light quantity.

According to the 7th aspect of the invention, in the photographic illumination device according to any of the 1st through 5th aspects, it is preferred that the light emission control means determines a level of drive current so as to sustain a supply of drive current to the light emission means while exposure is in progress over the exposure time.

According to the 8th aspect of the invention, a camera system comprises: a photographic illumination device according to any of the 1st through 7th aspects; and a camera having a range finding means that detects distance information indicating a distance to a main subject, an arithmetic operation means that calculates a quantity of light to be emitted by the light emission means by using the distance information, detected by the range finding means and an exposure time, an aperture value and a photographic sensitivity set in the camera, and a signal output means that outputs a signal indicating the light quantity calculated by the arithmetic operation means.

According to the 9th aspect of the invention, a camera comprises: a current-controlled light emission means that emits illuminating light toward a subject; a range finding means that detects distance information indicating a distance to a main subject; an arithmetic operation means that calculates a quantity of light to be emitted by the light emission means by using the distance information detected by the range finding means and an exposure time, an aperture value and a photographic sensitivity set therein; and a light emission control means that controls the light emission means to emit light in the calculated light quantity.

According to the 10th aspect of the invention, a camera system comprises: a current-controlled light emission means that emits illuminating light toward a subject; an arithmetic operation means that starts a light emission at the light emission means in response to a light emission start signal and calculates a quantity of light to be emitted by the light emission means by using information indicating an aperture value and photographic sensitivity set therein; and a light emission control means that controls a light emission quantity in conformance to the calculated light quantity.

According to the 11th aspect of the invention, a camera system comprises: a current-controlled light emission means that emits illuminating light toward a subject; an arithmetic operation means that starts a light emission at the light emission means in response to a light emission start signal and calculates a quantity of light to be emitted by the light emission means by using distance information set therein and information corresponding to an aperture value and photographic sensitivity set therein; and a light emission control means that controls a light emission quantity in conformance to the calculated light quantity.

According to the 12th aspect of the invention, a portable device comprises: a current-controlled light emission means that emits illuminating light toward a subject; an arithmetic operation means that starts a light emission at the light emission means in response to a light emission start signal and calculates a quantity of light to be emitted by the light emission means by using information indicating an aperture value and photographic sensitivity set therein; and a light emission control means that controls a light emission quantity in conformance to the calculated light quantity.

According to the 13th aspect of the invention, a portable device comprises: a current-controlled light emission means that emits illuminating light toward a subject; an arithmetic operation means that starts a light emission at the light emission means in response to a light emission start signal and calculates a quantity of light to be emitted by the light emission means by using distance information set therein and information corresponding to an aperture value and photographic sensitivity set therein; and a light emission control means that controls a light emission quantity in conformance to the calculated light quantity.

According to the 14th aspect of the invention, an image-capturing system comprises: an image-capturing device that captures an image of a subject; and an illumination device that illuminates the subject. The image-capturing device comprises a control means that calculates a light quantity needed to illuminate the subject based upon at least, either an exposure time or an aperture value and image-capturing sensitivity. The illumination device comprises a current-controlled light emission means that emits light used to illuminate the subject and a light emission control means that controls the light emission means so as to emit light in the light quantity calculated by the control means.

According to the 15th aspect of the invention, an image-capturing system according to the 14th aspect, it is preferred that the control means in the image-capturing device calculates the light quantity based upon the exposure time, the aperture value and the image-capturing sensitivity set therein and measured subject brightness, so as to achieve optimal exposure.

According to the 16th aspect of the invention, an image-capturing system according to the 14th aspect or the 15th aspect, it is preferred that: the image-capturing device further comprises a range finding means that detects distance information indicating a distance to the subject; and the control means in the image-capturing device calculates the light quantity by taking into consideration the distance information indicating the distance to the subject.

According to the 17th aspect of the invention, in the image-capturing system according to any of the 14th through 16th aspects, it is preferred that the light emission control means in the illumination device controls light emission intensity at the light emission means in correspondence to the exposure time.

According to the 18th aspect of the invention, in the image-capturing system according to the 17th aspect, it is preferred that the light emission control means in the illumination device controls the light emission intensity at the light emission means so as to emit light in the light quantity over the exposure time.

According to the 19th aspect of the invention, in the image-capturing system according to the 18th aspect, it is preferred that the light emission control means in the illumination device implements control so as to stop the light emission by the light emission means once light in the light quantity has been emitted.

According to the 20th aspect of the invention, in the image-capturing system according to any of the 14th through 19th aspects, it is preferred that the light emission control means in the illumination device has information indicating drive current and light emission intensity characteristics at the light emission means.

According to the 21st aspect of the invention, an illumination device is the illumination device constituting the image-capturing system according to any of the 14th through 20th aspects.

According to the 22nd aspect of the invention, a camera is a camera having the image-capturing device constituting the image-capturing system according to any of the 14th through 20th aspects.

According to the 23rd aspect of the invention, a camera corresponds to the image-capturing system according to any of the 14th through 20th aspects.

According to the 24th aspect of the invention, a portable device equipped with a camera corresponds to the image-capturing system according to any of the 14th through 20th aspects.

It is to be noted that the term "means" used above may be replaced with "unit".

DESCRIPTION OF THE PREFERRED EMBODIMENTS

The following is an explanation of the preferred embodiments of the present invention, given in reference to the drawings.

First Embodiment

Figure 1:
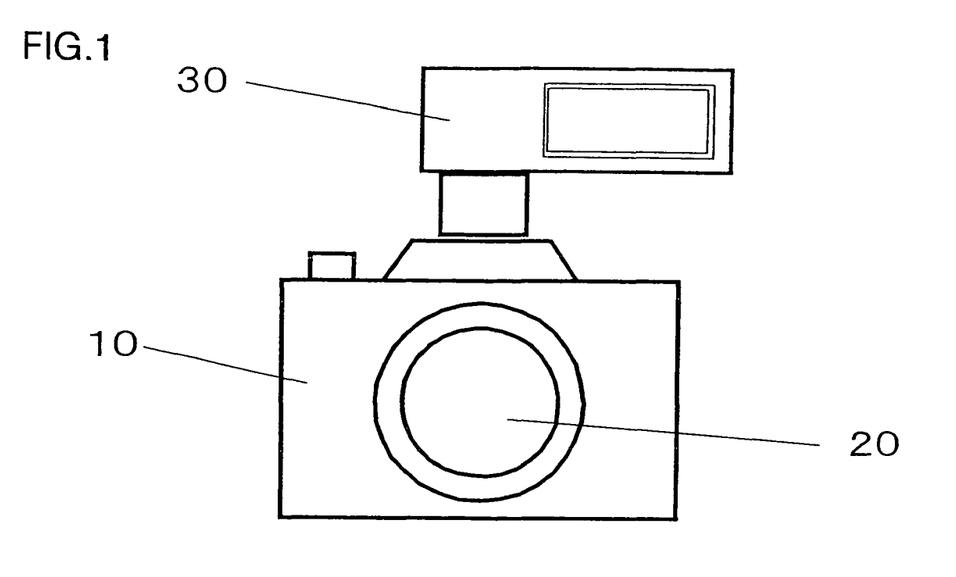
FIG. 1 illustrates the camera system achieved in a first embodiment of the present invention.

FIG. 1 illustrates the camera system achieved in the first embodiment of the present invention. FIG. 1 shows that an exchangeable photographic lens 20 is mounted at an electronic camera 10. In addition, an externally mounted flash unit 30 is mounted at an accessory shoe (not shown) of the electronic camera 10.

Figure 2:
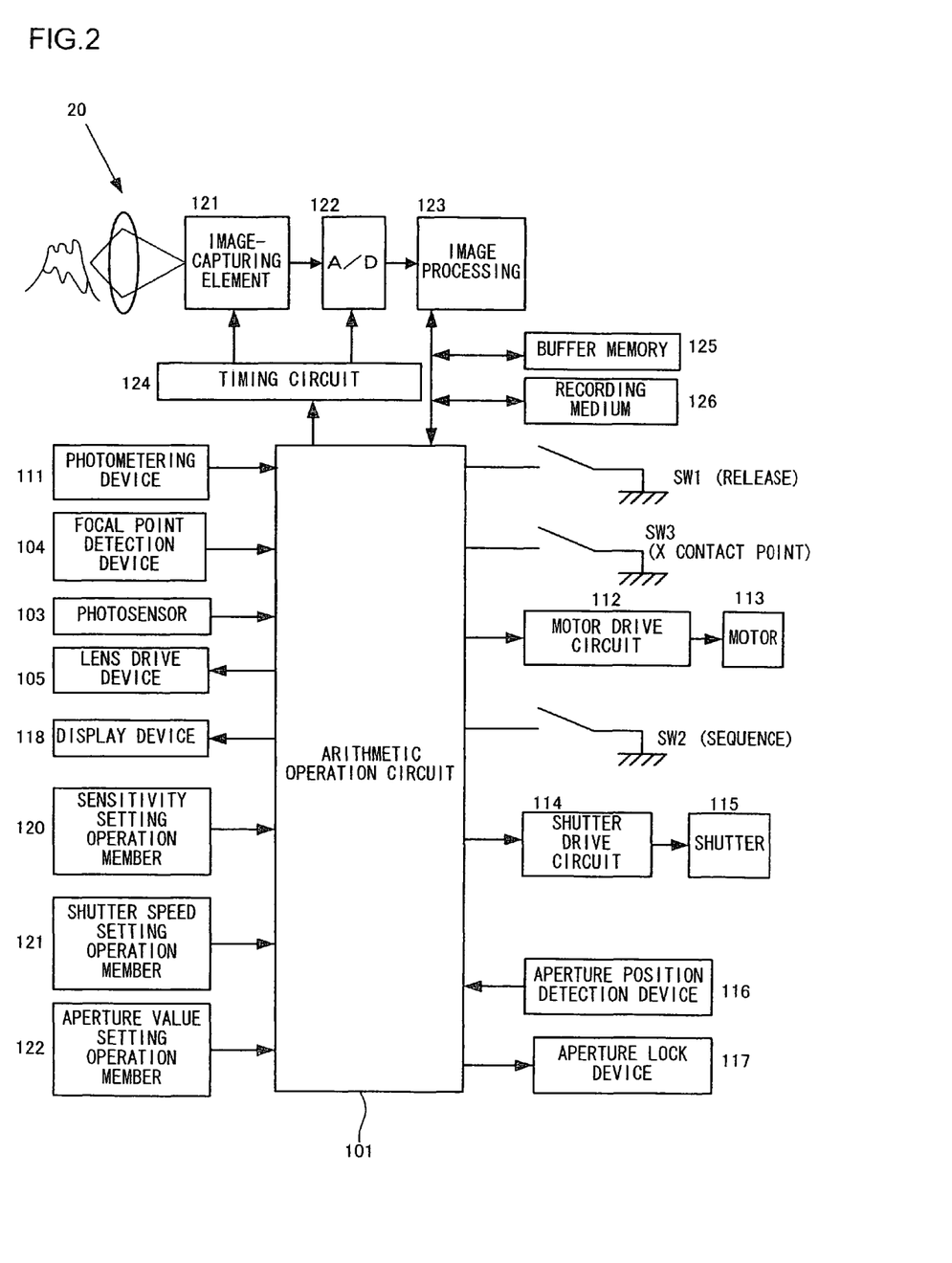
FIG. 2 is a block diagram of the structure in the essential portion of the electronic camera.

FIG. 2 is a block diagram of the essential structure adopted in the electronic camera 10. An arithmetic operation circuit 101 in FIG. 2 is constituted with a microcomputer and the like. The arithmetic operation circuit 101 executes specific arithmetic operations by using signals input thereto from the individual blocks to be detailed later and outputs control signals generated based upon the results of the arithmetic operations to the various blocks. The arithmetic operation circuit 101 further includes an interface circuit (not shown) which enables communication with the external flash unit 30.

An image-capturing element 121 may be constituted with a CCD image sensor or the like. The image-capturing element 121 captures an image formed with subject light having passed through the photographic lens 20 and outputs image-capturing signals to an A/D conversion circuit 122. At the A/D conversion circuit 122, the analog image-capturing signals are converted to digital signals. The image-capturing element 121 and the A/D conversion circuit 122 are driven so as to engage in operations with specific timing by drive signals output from a timing circuit 124.

An image processing circuit 123 is constituted with an ASIC and the like. In addition to executing image processing such as white balance processing on the image data resulting from digital conversion, the image processing circuit 123 executes compression processing for compressing the image data having undergone the image processing into a specific format, decompression processing for decompressing the compressed image data and the like. In a buffer memory 125, image data to be processed by the image processing circuit 123 are temporarily stored. A recording medium 126 is constituted with a memory card or the like that can be detachably loaded into the camera. Image data having undergone the image processing are recorded into the recording medium 126.

A photometering device 111 detects the quantity of subject light having passed through the photographic lens 20 and outputs a detection signal to the arithmetic operation circuit 101. The arithmetic operation circuit 101 calculates the subject brightness by using this detection signal. A photosensor 103 receives light having been emitted from the external flash unit 30 and reflected from the subject. The photosensor 103 also outputs a time integral value obtained through time integration of the light reception signal to the arithmetic operation circuit 101.

A focal point detection device 104 detects the state of the focal point position adjustment achieved with the photographic lens 20 and outputs a detection signal to the arithmetic operation circuit 101. A lens drive device 105 drives a focus lens (not shown) within the photographic lens 20 forward/backward along the optical axis in response to a command issued by the arithmetic operation circuit 101, so as to adjust the position of the focal point of the photographic lens 20. It is to be noted that a detection signal provided by the focal point detection device 104 constitutes distance information that corresponds to the distance to the main subject.

At a display device 118, photographic information such as the shutter speed and the aperture value is displayed in response to a command issued by the arithmetic operation circuit 101.

A shutter release switch SW1 outputs a shutter release operation signal to the arithmetic operation circuit 101 by interlocking with a depression of a shutter release operation button (not shown).

A motor drive circuit 112 controls drive of a sequence motor 113 in response to a command issued by the arithmetic operation circuit 101. The sequence motor 113, which is part of a sequence drive device (not shown), raises/lowers a mirror (not shown), drives an aperture (not shown) and charges a shutter 115.

A sequence switch SW2, which is also part of the sequence drive device mentioned above, generates brake control timing for the sequence motor 113 and the like.

A shutter drive circuit 114 individually controls holds on and releases of a front curtain and a rear curtain (not shown) of the shutter 115. An X contact point switch SW3 enters an on state and outputs an ON signal as a run of the front curtain at the shutter 115 is completed and enters an off state and outputs an OFF signal halfway through the charge of the shutter 115.

An aperture position detection device 116 detects the aperture position corresponding to the aperture value and outputs a detection signal to the arithmetic operation circuit 101. An aperture lock device 117 stops the aperture being driven and locks the aperture at a specific aperture value.

A sensitivity setting operation member 120 outputs an operation signal corresponding to an image-capturing sensitivity setting operation to the arithmetic operation circuit 101. Based upon the operation signal input thereto, the arithmetic operation circuit 101 adjusts the image-capturing sensitivity setting for the image-capturing element 121. The image-capturing sensitivity may be set in specific steps within a range equivalent to, for instance, ISO 100 through ISO 1600.

A shutter speed setting operation member 121 outputs an operation signal corresponding to a shutter speed setting operation to the arithmetic operation circuit 101. The arithmetic operation circuit 101 adjusts the shutter speed setting based upon the operation signal input thereto. The shutter speed may be set in specific steps within a range of, for instance, 1/8000 sec to 1 sec.

An aperture value setting operation member 122 outputs an operation signal corresponding to an aperture setting operation to the arithmetic operation circuit 101. The arithmetic operation circuit 101 adjusts the aperture value setting based upon the operation signal input thereto. The aperture value may be set in specific steps within a range of, for instance, F 1.4 through F 22.

The arithmetic operation circuit 101 achieved in the present invention executes an exposure calculation as expressed in (1) to (3) below by using the current setting for the aperture value AV, the current setting for shutter speed TV, the subject brightness BV calculated as described earlier and the current setting for image-capturing sensitivity SV, when the camera is set to execute a photographing operation with light emitted from the external flash unit 30.

$$EV=BV+SV \quad (1)$$

$$EV1=AV+TV \quad (2)$$

$$\Delta EV=EV-EV1 \quad (3)$$

EV in expression (1) represents the optimal exposure quantity. The arithmetic operation circuit 101 calculates the optimal exposure quantity EV based upon the subject brightness BV and the image-capturing sensitivity SV. The exposure quantity EV1 in expression (2) is an exposure quantity determined in correspondence to the current aperture value setting AV and the current shutter speed setting TV. Namely, EV1 is a control exposure quantity. Under normal circumstances, the values for the aperture value AV and the shutter speed TV are set so as to match the control exposure quantity EV1 with the optimal exposure quantity EV. However, if the aperture value AV or the shutter speed TV is set in advance or if the aperture value AV or the shutter speed TV exceeds its limit value, the control exposure quantity EV1 and the optimal exposure quantity EV may not match. It is to be noted that the optimal exposure quantity and the control exposure quantity may be simply referred to as optimal exposure and control exposure respectively.

The exposure deviation $\Delta EV$ in expression (3) represents the difference between the optimal exposure quantity EV and the control exposure quantity EV1. In order to achieve the correct exposure, the arithmetic operation circuit 101 calculates the quantity of light to be emitted from the flash unit 30 in correspondence to the exposure deviation ΔEV. In other words, with the light emitted from the flash unit 30 in the quantity corresponding to the exposure deviation ΔEV which is calculated by the arithmetic operation circuit 101, the optimal exposure quantity EV and the control exposure quantity EV1 can be made to match each other. The arithmetic operation circuit 101 increases/decreases the quantity of light to be emitted based upon the distance information indicating the distance to the main subject.

Figure 3:
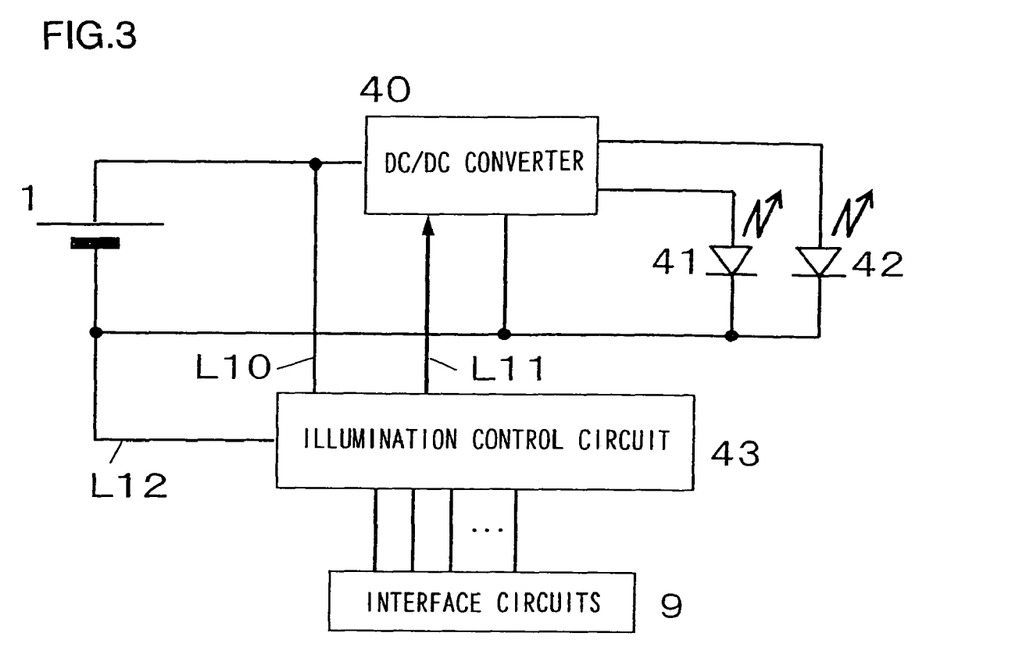
FIG. 3 is a block diagram of the structure adopted in the essential portion of the externally mounted flash unit.

FIG. 3 is a block diagram of the essential structure adopted in the external flash unit 30. As shown in FIG. 3, the external flash unit 30 includes an illumination control circuit 43, a DC/DC converter 40, LEDs (light emitting diodes) 41 and 42 and an interface circuit 9.

The DC/DC converter 40 is constituted of, for instance, an integrated circuit used to drive the LEDs. The DC/DC converter 40 boosts a battery voltage supplied from a battery 1 via power lines L10 and L12 to a voltage achieving a predetermined voltage level (e.g., 3V) needed to drive the LEDs 41 and 42. In addition, the DC/DC converter 40 supplies specific levels of electric current to the LED 41 and the LED 42 in response to a command transmitted from the illumination control circuit 43 via a signal line L11. The values representing the levels of the current to be supplied to the LEDs 41 and 42 are determined by the illumination control circuit 43.

The LEDs 41 and 42 emit so-called white light. As is already known, an LED is a current-controlled device that manifests a proportional relationship between the drive current and the light emission intensity (light power) within its rated range. By controlling the drive current supplied to the LED 41 and the LED 42, the illumination control circuit 43 controls the quantities of light emitted from the LEDs 41 and 42.

Once the external flash unit 30 is mounted at the accessory shoe (not shown) of the electronic camera 10, the arithmetic operation circuit 101 in the electronic camera 10 becomes connected with the illumination control circuit 43 via the interface circuit 9. The signals that become connected as a result include the X contact point signal from the X contact point switch SW3, the signal indicating the quantity of emitted light and the signal indicating the shutter speed.

The X contact point signal is outputs to the illumination control circuit 43 while a signal output is allowed by the arithmetic operation circuit 101 but is not output to the illumination control circuit 43 if the signal output is disallowed by the arithmetic operation circuit 101.

The illumination control circuit 43 is constituted with a microcomputer and the like. Upon receiving the signal indicating the quantity of emitted light from the arithmetic operation circuit 101, the illumination control circuit 43 calculates the values of the drive current needed to have illuminating light emitted from the LEDs 41 and 42 in the quantity corresponding to the received signal and the length of current supply period (i.e., the length of time over which light is to be emitted). Namely, the quantity of light to be emitted is indicated as the integrated value obtained by integrating the light emission intensity over the length of time over which light is emitted. As an X contact point ON signal is input from the arithmetic operation circuit 101, the illumination control circuit 43 issues an instruction for the DC/DC converter 40 indicating the drive current value and a light emission start, and once the light emission period elapses, it issues an instruction for a light emission stop.

The present invention is characterized by the drive current supplied to the LEDs in order to enable the flash unit 30 to emit light in the required quantity and the length of time over which the current is supplied in the camera system described above. In the first embodiment, light is emitted continuously at a constant light emission intensity level within the exposure time range corresponding to the shutter speed setting.

Figure 4:
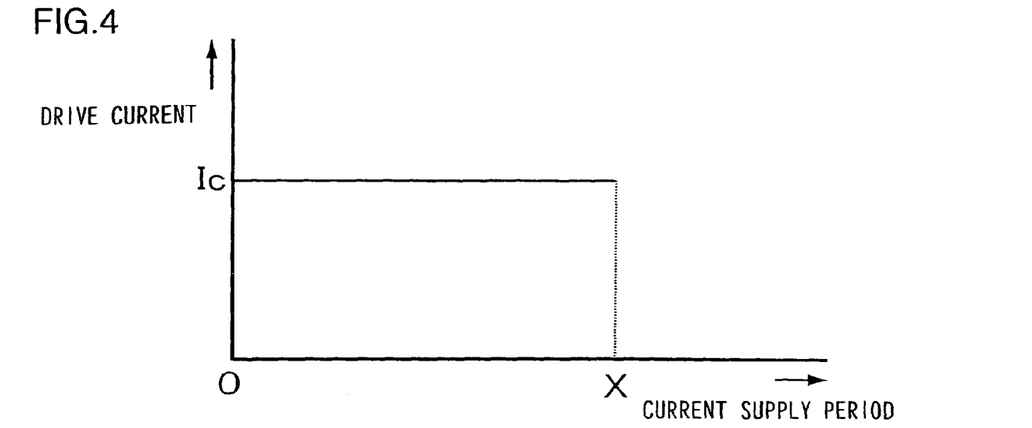
FIG. 4 shows the relationship between the length of current supply period and the drive current which is determined by the illumination control circuit.

FIG. 4 shows the relationship between the length of current supply period and the drive current determined by the illumination control circuit 43. The horizontal axis and the vertical axis in FIG. 4 respectively represent the length of current supply period and the drive current. Upon receiving the signals indicating the quantity of light to be emitted and the shutter speed (exposure time) from the arithmetic operation circuit 101, the illumination control circuit 43 calculates the light emission intensity needed to achieve the indicated quantity of emitted light through a light emission at a constant intensity level during the exposure and determines the drive current Ic needed to execute the light emission at this light emission intensity level. In the example presented in FIG. 4, the length of current supply period X corresponds to the length of exposure time.

The relationship between the light emission intensity and the drive current is stored in advance in a nonvolatile memory inside the illumination control circuit 43 as a table based upon the results of an actual measurement. The illumination control circuit 43 references the table by using the light emission intensity level as an argument to determine the value of the required drive current and outputs the current value thus determined to the DC/DC converter 40.

Since there are two LEDs, the illumination control circuit 43 determines the drive current for each of the LEDs in the embodiment. It is to be noted that the sum of the quantities of light to be emitted by the LED 41 and the LED 42 corresponds to the quantity of light to be emitted which is indicated by the arithmetic operation circuit 101.

The first embodiment explained above is now summarized.
(1) When the camera system is set for a photographing operation to be executed with light emitted from the external flash unit 30, the exposure calculation is executed by using the current aperture value setting AV, the current shutter speed setting TV, the detected subject brightness BV and the current image-capturing sensitivity setting SV, and the control exposure which includes the quantity of light to be emitted from the flash unit 30 is calculated in correspondence to the difference ΔEV between the control exposure and the optimal exposure in order to achieve the optimal exposure. As a result, accurate exposure control can be implemented regardless of whether the shutter speed is high or low.
(2) The LEDs 41 and 42 which are current-controlled devices are used as light emitting elements in the flash unit 30, and thus, unlike in an illumination device using a discharge type light emitting tube such as a xenon tube, no high-voltage circuit is required. Furthermore, light can be continuously emitted at a constant intensity level over a specific length of time. As a result, the cost of the drive circuit is reduced, the light emission can start without having to allow for any preparatory time period (for charging and the like), and light can be emitted continuously during the exposure even when the shutter speed is low.
(3) Since the flash unit 30 is allowed to emit light continuously within the exposure time range corresponding to the shutter speed setting, the light emission intensity level can be lowered. Thus, the extent of glare manifesting during a short-range photographing operation is not as pronounced as that experienced when light is emitted at a high level of light emission intensity only over part of the exposure time. In addition, by emitting light continuously during a low speed photographing operation, raindrops, flowing water and the like in the subject can be represented for example.

(4) Since the relationship between the light emission intensity and the drive current is stored in a nonvolatile memory in the illumination control circuit 43 as a table, the quantity of light to be emitted can be controlled with a high degree of accuracy even if the current light emission intensity characteristics among individual LED are not consistent. In addition, even if the current light emission intensity characteristics of the LED 41 are different from those of the LED 42, light emission can be controlled so as to match the levels of light emission intensity at the two LEDs.

While two LEDs are utilized in the example explained above, the number of LEDs is not limited to two, and a single LED or five LEDs may be used instead.

Figure 5:
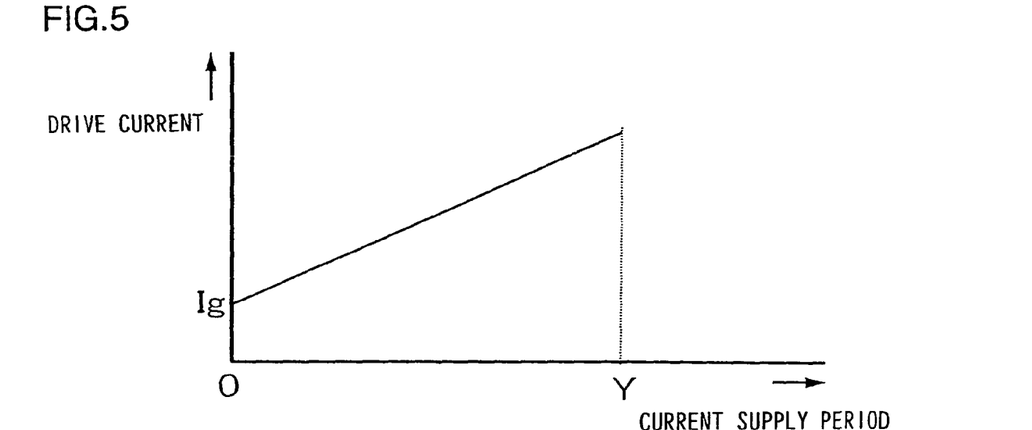
FIG. 5 shows the relationship between the length of current supply period and the drive current achieved in an example of a variation.

Within the range of exposure time corresponding to the shutter speed setting, the intensity of light emission can be gradually raised during the continuous light emission. FIG. 5 shows the relationship between the length of current supply period and the drive current determined by the illumination control circuit 43 in such a variation. In FIG. 5, the horizontal axis represents the length of current supply period and the vertical axis represents the drive current. Upon receiving the signals indicating the quantity of light to be emitted and the shutter speed (exposure time) from the arithmetic operation circuit 101, the illumination control circuit 43 calculates a light emission intensity pattern with which the indicated quantity of emitted light can be obtained by gradually increasing the light emission intensity during the exposure and then determines the drive current (including the current increase rate and the length of current supply period) needed to achieve this light emission intensity pattern. In the example presented in FIG. 5, the length of current supply period Y corresponds to the length of exposure time and the current value at the light emission start is Ig.

While the drive current is increased at a constant rate in FIG. 5, the increase rate may be altered over time instead.

Figure 6:
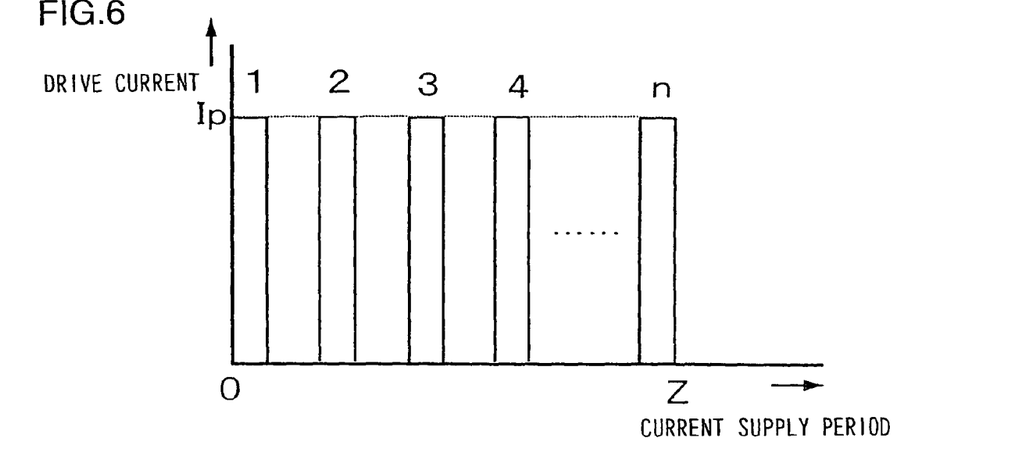
FIG. 6 shows the relationship between the length of current supply period and the drive current achieved in another example of a variation.

In addition, within the range of exposure time corresponding to the shutter speed setting, the required quantity of emitted light may be obtained through repeated pulse light emissions. FIG. 6 shows the relationship between the length of current supply period and the drive current determined by the illumination control circuit 43 in such a variation. In FIG. 6, the horizontal axis represents the length of current supply period and the vertical axis represents the drive current. Upon receiving the signals indicating the quantity of light to be emitted and the shutter speed (exposure time) from the arithmetic operation circuit 101, the illumination control circuit 43 calculates a light emission intensity pattern with which the indicated quantity of emitted light can be obtained through repeated pulse light emissions executed during the exposure and then determines the drive current (including the pulse current and the number of pulses) needed to achieve this light emission intensity pattern. In the example presented in FIG. 6, the length of current supply period Z corresponds to the length of exposure time and pulse light is emitted n times with the drive current Ip.

Second Embodiment

In the second embodiment, a time integral value provided by the photosensor 103 after a light emission starts at the flash unit 30 is monitored and the light emission at the flash unit 30 is stopped once the time integral value becomes equal to the required quantity of light to be emitted within the range of exposure time corresponding to the shutter speed setting.

Upon receiving the signal indicating the quantity of light to be emitted from the arithmetic operation circuit 101, the illumination control circuit 43 calculates the values of the drive current and the length of current supply period (i.e., the length of time over which light is to be emitted) needed to have illuminating light emitted from the LEDs 41 and 42 in the quantity corresponding to the received signal. Then, in response to an X contact point ON signal input from the arithmetic operation circuit 101, the illumination control circuit 43 issues an instruction indicating the drive current and a light emission start to the DC/DC converter 40. The operation of the illumination control circuit executed up to this point is identical to that in the first embodiment.

Upon judging that the time integral value provided by the photosensor 103 has reached a decision-making threshold value, the arithmetic operation circuit 101 issues an instruction for the illumination control circuit 43 to stop the light emission. The decision-making threshold value corresponds to the quantity of light to be emitted determined through the exposure calculation. In this situation, the illumination control circuit 43 outputs a command for the DC/DC converter 40 to stop the light emission at the LED 41 and the LED 42 even if the exposure time is not up yet. It is to be noted that if the time integral value provided by the photosensor 103 does not reach the decision-making threshold value, an instruction for a light emission stop is issued once the originally calculated length of current supply period (which corresponds to the length of exposure time) elapses.

In the second embodiment explained above, the light having been emitted from the flash unit 30 to illuminate the main subject and having been reflected off the main subject is monitored in real-time, and if the time integral value of the reflected light becomes equal to a value corresponding to the required quantity of light to be emitted, the supply of the drive current to the LED 41 and the LED 42 is stopped. As a result, over exposure attributable to the illuminating light is prevented.

The second embodiment explained above may be adopted in any of the three applications described earlier; 1) when continuously emitting light at a constant light emission intensity within the range of exposure time corresponding to the shutter speed setting (FIG. 4), 2) when gradually increasing the light emission intensity during a continuous light emission (FIG. 5) and 3) when repeatedly executing pulse light emission (FIG. 5).

Third Embodiment

In the third embodiment, the quantity of light to be emitted is calculated in advance at the arithmetic operation circuit 101 based upon the distance information that have been obtained, the aperture value information and the photographing sensitivity information, and the LEDs 41 and 42 emit light at the intensity level over the length of time both determined by the arithmetic operation circuit. The third embodiment allows the light emission intensity level at the light emission start to be set at an appropriate value. Since other features of the third embodiment are identical to those of the first embodiment, their explanation is omitted.

Fourth Embodiment

The photosensor 103 receives light reflected off the subject illuminated with light emitted from the LEDs 41 and 42 which starts the light emission based upon the aperture value information and the photographic sensitivity information in response to a light emission start signal, and the light emission is stopped once an optimal value is achieved in the fourth embodiment. As in the third embodiment, the light emission intensity level at the light emission start can be set to an appropriate value in the fourth embodiment. Since other features are identical to those in the first embodiment, their explanation is omitted.

While an explanation is given above on an example in which the present invention is adopted in conjunction with the external flash unit 30, a flash unit may instead be built into a camera main unit or a portable device such as a portable telephone.

In addition, while the distance is measured by the electronic camera 10, the information indicating the distance to the subject may instead be detected by the flash unit 30, or such information may be obtained in advance as data.

The exposure calculation may be executed at the flash unit 30 as well. In such a case, information indicating the aperture value and the shutter speed set in the camera is provided to the flash unit 30 from the camera through communication between the arithmetic operation circuit 101 and the flash unit 30.

Figure 7A:
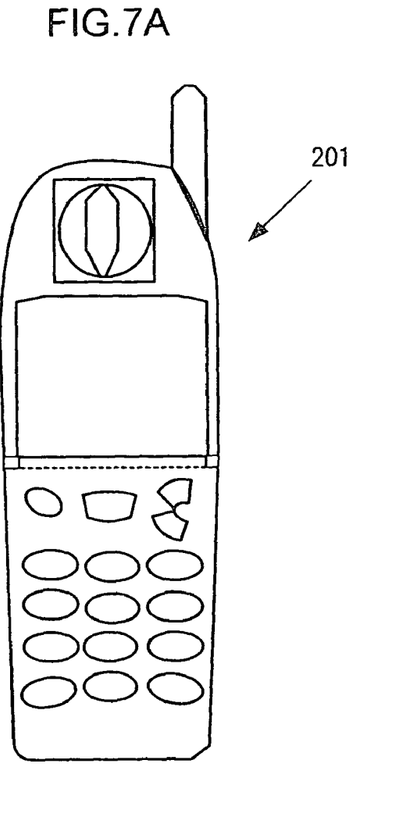
FIG. 7A shows the interior surfaces of a portable telephone in an open state.
Figure 7B:
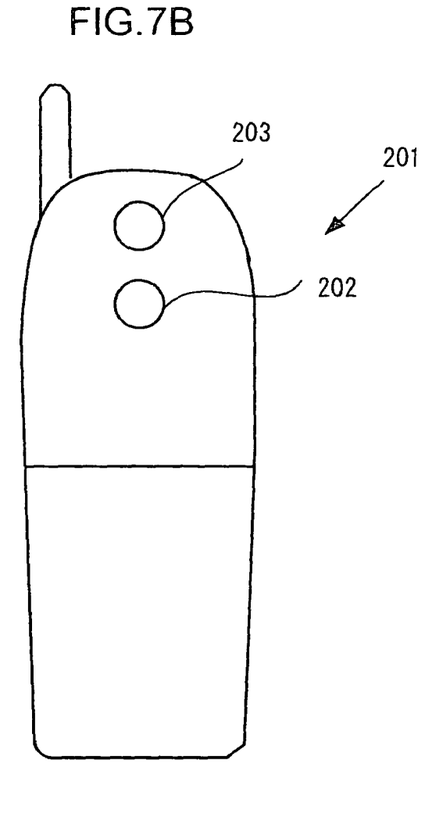
FIG. 7B shows the exterior surfaces of the portable telephone in an open state.

While an explanation is given above on an example in which the present invention is adopted in an electronic camera, the present invention may also be adopted in conjunction with a film camera or a portable device such as a portable telephone (a cellular phone). FIGS. 7A and 7B show how the present invention may be adopted in a portable telephone. FIG. 7A shows the interior surfaces of a portable telephone 201 in an open state, whereas FIG. 7B shows the exterior surfaces of the portable telephone 201 in an open state. The portable telephone 201 includes a camera unit 202 and an illumination unit 203.

It is to be noted that the individual components described above may be alternatively referred to as follows. The LEDs 41 and 42 may be referred to as means for light emission. The focal point detection device 104 may be referred to as a means for range finding. The illumination control circuit 43 may be referred to as a means for light emission control. The arithmetic operation circuit 101 may be referred to as a means for arithmetic operation and also as a means for signal transmission.

The above described embodiments are examples and various modifications can be made without departing from the spirit and scope of the invention.

What is claimed is:

1. A photographic illumination device, comprising:
a current-controlled light emission unit that manifests a proportional relationship between a drive current and a light emission intensity and emits illuminating light toward a subject, wherein the light emission intensity of the illuminating light is controlled to vary according to the drive current;
a range finding unit that detects distance information indicating a distance to a main subject; and
a light emission control unit that controls the current-controlled light emission unit to emit light in a quantity calculated by using the distance information detected by the range finding unit and an exposure time corresponding to a shutter speed, an aperture value and a photographic sensitivity set in a camera, when capturing an image of the subject by the camera, wherein
the light emission control unit calculates a value of the drive current with which the current-controlled light emission unit emits the illuminating light continuously over a time length determined according to the exposure time to achieve the quantity of emitted light, and
the light emission control unit, within a period of the exposure time, gradually increases the drive current that is continuously supplied to the current-controlled light emission unit so that the current-controlled light emission unit emits light in the calculated quantity and stops supplying the drive current once an integrated value representing light having been reflected off the subject illuminated by the current-controlled light emission unit becomes equal to a value corresponding to the calculated light quantity.

2. A photographic illumination device according to claim 1, wherein:
the light emission control unit continuously supplies the drive current to the light emission unit over a specific length of time.

3. A photographic illumination device according to claim 1, wherein:
the light emission control unit determines a level of drive current so as to sustain a supply of drive current to the light emission unit while exposure is in progress over the exposure time.

4. A camera system, comprising:
the photographic illumination device according to claim 1; and
a camera having the range finding unit that detects the distance information indicating the distance to the main subject, an arithmetic operation unit that calculates the quantity of light to be emitted by the light emission unit by using the distance information detected by the range finding unit and the exposure time corresponding to the shutter speed, an aperture value and a photographic sensitivity set in the camera, and a signal output unit that outputs a signal indicating the light quantity calculated by the arithmetic operation unit, when capturing the image of the subject by the camera.

5. A photographic illumination device according to claim 1, wherein:
a rate of increase of the drive current is altered over time.

6. A photographic illumination device, comprising:
a current-controlled light emission unit that manifests a proportional relationship between a drive current and a light emission intensity and emits illuminating light toward a subject, wherein the light emission intensity of the illuminating light is controlled to vary according to the drive current; and
a light emission control unit that controls the current-controlled light emission unit to emit light in a quantity calculated by using distance information indicating a distance to a main subject which is detected by a range finding unit in a camera and an aperture time, an aperture value and a photographic sensitivity set in the camera, wherein
the light emission control unit calculates a value of the drive current with which the current-controlled light emission unit emits the illuminating light continuously over a time length determined according to an exposure time corresponding to a shutter speed to achieve the quantity of emitted light, when capturing an image of the subject by the camera, and
the light emission control unit, within a period of the exposure time, gradually increases the drive current that is continuously supplied to the current-controlled light emission unit so that the current-controlled light emission unit emits light in the calculated quantity and stops supplying the drive current once an integrated value representing light having been reflected off the subject illuminated by the current-controlled light emission unit becomes equal to a value corresponding to the calculated light quantity.

7. A camera, comprising:
a current-controlled light emission unit that manifests a proportional relationship between a drive current and a light emission intensity and emits illuminating light toward a subject, wherein the light emission intensity of the illuminating light is controlled to vary according to the drive current;
a range finding unit that detects distance information indicating a distance to a main subject;
an arithmetic operation unit that calculates a quantity of light to be emitted by the current-controlled light emission unit by using the distance information detected by the range finding unit and an exposure time corresponding to a shutter speed, an aperture value and a photographic sensitivity set therein, when capturing an image by the camera; and
a light emission control unit that controls the current-controlled light emission unit to emit light in the calculated light quantity, wherein
the light emission control unit calculates a value of the drive current with which the current-controlled light emission unit emits the illuminating light continuously over a time length determined according to the exposure time to achieve the quantity of emitted light, and
the light emission control unit, within a period of the exposure time, gradually increases the drive current that is continuously supplied to the current-controlled light emission unit so that the current-controlled light emission unit emits light in the calculated quantity and stops supplying the drive current once an integrated value representing light having been reflected off the subject illuminated by the current-controlled light emission unit becomes equal to a value corresponding to the calculated light quantity.

8. A camera system, comprising:
a current-controlled light emission unit that manifests a proportional relationship between a drive current and a light emission intensity and emits illuminating light toward a subject, wherein the light emission intensity of the illuminating light is controlled to vary according to the drive current;
an arithmetic operation unit that starts a light emission at the current-controlled light emission unit in response to a light emission start signal and calculates a quantity of light to be emitted by the current-controlled light emission unit by using information indicating an aperture value and photographic sensitivity set therein; and
a light emission control unit that controls a light emission quantity in conformance to the calculated light quantity, wherein
the light emission control unit calculates a value of the drive current with which the current-controlled light emission unit emits the illuminating light continuously over a time length determined according to an exposure time corresponding to a shutter speed to achieve the quantity of emitted light, when capturing an image of the subject by a camera, and
the light emission control unit, within a period of the exposure time, gradually increases the drive current that is continuously supplied to the current-controlled light emission unit so that the current-controlled light emission unit emits light in the calculated quantity and stops supplying the drive current once an integrated value representing light having been reflected off the subject illuminated by the current-controlled light emission unit becomes equal to a value corresponding to the calculated light quantity.

9. A camera system, comprising:
a current-controlled light emission unit that manifests a proportional relationship between a drive current and a light emission intensity and emits illuminating light toward a subject, wherein the light emission intensity of the illuminating light is controlled to vary according to the drive current;
an arithmetic operation unit that starts a light emission at the current-controlled light emission unit in response to a light emission start signal and calculates a quantity of light to be emitted by the current-controlled light emission unit by using distance information to a main subject set therein and information corresponding to an aperture value and photographic sensitivity set therein; and
a light emission control unit that controls a light emission quantity in conformance to the calculated light quantity, wherein
the light emission control unit calculates a value of the drive current with which the current-controlled light emission unit emits the illuminating light continuously over a time length determined according to an exposure time corresponding to a shutter speed to achieve the quantity of emitted light, when capturing an image of the subject by a camera, and
the light emission control unit, within a period of the exposure time, gradually increases the drive current that is continuously supplied to the current-controlled light emission unit so that the current-controlled light emission unit emits light in the calculated quantity and stops supplying the drive current once an integrated value representing light having been reflected off the subject illuminated by the current-controlled light emission unit becomes equal to a value corresponding to the calculated light quantity.

10. A portable device, comprising:
a current-controlled light emission unit that manifests a proportional relationship between a drive current and a light emission intensity and emits illuminating light toward a subject, wherein the light emission intensity of the illuminating light is controlled to vary according to the drive current;
an arithmetic operation unit that starts a light emission at the current-controlled light emission unit in response to a light emission start signal and calculates a quantity of light to be emitted by the current-controlled light emission unit by using information indicating an aperture value and photographic sensitivity set therein; and
a light emission control unit that controls a light emission quantity in conformance to the calculated light quantity, wherein
the light emission control unit calculates a value of the drive current with which the current-controlled light emission unit emits the illuminating light continuously over a time length determined according to an exposure time corresponding to a shutter speed to achieve the quantity of emitted light, when capturing an image of the subject by a camera, and
the light emission control unit, within a period of the exposure time, gradually increases the drive current that is continuously supplied to the current-controlled light emission unit so that the current-controlled light emission unit emits light in the calculated quantity and stops supplying the drive current once an integrated value representing light having been reflected off the subject illuminated by the current-controlled light emission unit becomes equal to a value corresponding to the calculated light quantity.

11. A portable device, comprising:

a current-controlled light emission unit that manifests a proportional relationship between a drive current and a light emission intensity and emits illuminating light toward a subject, wherein the light emission intensity of the illuminating light is controlled to vary according to the drive current;

an arithmetic operation unit that starts a light emission at the current-controlled light emission unit in response to a light emission start signal and calculates a quantity of light to be emitted by the current-controlled light emission unit by using distance information to a main subject set therein and information corresponding to an aperture value and photographic sensitivity set therein; and a light emission control unit that controls a light emission quantity in conformance to the calculated light quantity, wherein the light emission control unit calculates a value of the drive current with which the current-controlled light emission unit emits the illuminating light continuously over a time length determined according to an exposure time corresponding to a shutter speed to achieve the quantity of emitted light, when capturing an image of the subject by a camera, and the light emission control unit, within a period of the exposure time, gradually increases the drive current that is continuously supplied to the current-controlled light emission unit so that the current-controlled light emission unit emits light in the calculated quantity and stops supplying the drive current once an integrated value representing light having been reflected off the subject illuminated by the current-controlled light emission unit becomes equal to a value corresponding to the calculated light quantity.

12. An image-capturing system, comprising:

an image-capturing device that captures an image of a subject; and an illumination device that illuminates the subject, wherein:

the image-capturing device comprises a control unit that calculates a light quantity needed to illuminate the subject based upon at least, either an exposure time corresponding to a shutter speed or an aperture value and image-capturing sensitivity, when capturing an image of the subject by the image-capturing device; and the illumination device comprises a current-controlled light emission unit that manifests a proportional relationship between a drive current and a light emission intensity and emits light used to illuminate the subject, and a light emission control unit that controls the current-controlled light emission unit so as to emit light in the light quantity calculated by the control unit, wherein the light emission intensity of the illuminating light is controlled to vary according to the drive current, the current-controlled light emission control unit calculates a value of the drive current with which the current-controlled light emission unit emits the illuminating light continuously over a time length determined according to the exposure time to achieve the quantity of emitted light, and the light emission control unit, within a period of the exposure time, gradually increases the drive current that is continuously supplied to the current-controlled light emission unit so that the current-controlled light emission unit emits light in the calculated quantity and stops supplying the drive current once an integrated value representing light having been reflected off the subject illuminated by the current-controlled light emission unit becomes equal to a value corresponding to the calculated light quantity.

13. An image-capturing system according to claim 12, wherein:

the control unit in the image-capturing device calculates the light quantity based upon the exposure time, the aperture value and the image-capturing sensitivity set therein and measured subject brightness, so as to achieve optimal exposure.

14. An image-capturing system according to claim 12, wherein:

the image-capturing device further comprises a range finding unit that detects distance information indicating a distance to the subject; and the control unit in the image-capturing device calculates the light quantity by taking into consideration the distance information indicating the distance to the subject.

15. An image-capturing system according to claim 12, wherein:

the light emission control unit in the illumination device controls light emission intensity at the current-controlled light emission unit in correspondence to the exposure time.

16. An image-capturing system according to claim 15, wherein:

the light emission control unit in the illumination device controls the light emission intensity at the current-controlled light emission unit so as to emit light in the light quantity over the exposure time.

17. An image-capturing system according to claim 16, wherein:

the light emission control unit in the illumination device implements control so as to stop the light emission by the current-controlled light emission unit once light in the light quantity has been emitted.

18. An image-capturing system according to claim 12, wherein:

the light emission control unit in the illumination device has information indicating drive current and light emission intensity characteristics at the current-controlled light emission unit.

19. An illumination system constituting an image-capturing system according to claim 12.

20. A camera having an image-capturing device constituting an image-capturing system according to claim 12.

21. An image-capturing system according to claim 12, wherein:

the image-capturing system is a camera.

22. An image-capturing system according to claim 12, wherein:

the image-capturing system is a portable device equipped with a camera.

* * * * *